(12) United States Patent
Idei

(10) Patent No.: US 10,031,278 B2
(45) Date of Patent: Jul. 24, 2018

(54) LIGHT SOURCE DEVICE AND DISPLAY DEVICE

(71) Applicant: Sakai Display Products Corporation, Sakai-shi, Osaka (JP)

(72) Inventor: Kazuya Idei, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 173 days.

(21) Appl. No.: 14/765,548

(22) PCT Filed: Jun. 13, 2014

(86) PCT No.: PCT/JP2014/065784
§ 371 (c)(1),
(2) Date: Aug. 3, 2015

(87) PCT Pub. No.: WO2014/208368
PCT Pub. Date: Dec. 31, 2014

(65) Prior Publication Data
US 2015/0378090 A1    Dec. 31, 2015

(30) Foreign Application Priority Data
Jun. 27, 2013  (JP) ................................ 2013-135405

(51) Int. Cl.
*G09F 13/08*    (2006.01)
*F21V 29/00*    (2015.01)
(Continued)

(52) U.S. Cl.
CPC ......... *G02B 6/0085* (2013.01); *G02B 6/0055* (2013.01); *G02B 6/0091* (2013.01); *G02F 2001/133628* (2013.01)

(58) Field of Classification Search
CPC ... G02F 2001/133618; G02F 1/133615; G02F 1/133608; G02F 2001/133628;
(Continued)

(56) References Cited

U.S. PATENT DOCUMENTS 5,710,856 A * 1/1998 Ishii ....................... B32B 27/20
362/623
5,729,310 A * 3/1998 Horiuchi .............. G02B 6/0088
349/58

(Continued)

FOREIGN PATENT DOCUMENTS

JP     2004-101693 A    4/2004
JP     2009-202532 A    9/2009
WO    WO2013008740 A1    1/2013

*Primary Examiner* — Erin Kryukova
(74) *Attorney, Agent, or Firm* — Rudy J. Ng; Bret E. Field; Bozicevic, Field & Francis LLP

(57) ABSTRACT

A light source device and a display device capable of preventing a problem of torsion occurring in a back chassis due to an unevenness in a temperature distribution are provided.

In a light source device including: a light guide plate that outputs light incident from one side face from one face; a light source that is arranged on the one side face side of the light guide plate; and a back chassis that has a bottom arranged to face the other face of the light guide plate, by forming a reflection film reflecting light incident from the light guide plate to the light guide plate in a heat absorption plate portion that is arranged between the light guide plate and the bottom of the back chassis and absorbs heat emitted from the light source, the heat absorption plate portion absorbs heat generated from the light source and achieves the role of a reflection sheet.

7 Claims, 4 Drawing Sheets

(51) Int. Cl.
*B60Q 1/06* (2006.01)
*F21V 7/04* (2006.01)
*F21V 8/00* (2006.01)
*G02F 1/1335* (2006.01)

(58) Field of Classification Search
CPC ...... G02F 2001/133314; G02B 6/0085; G02B 6/0055; G02B 6/0091; F21V 29/89; F21V 7/22; F21V 29/713; F21V 29/70; F21V 29/71; F21V 29/85
See application file for complete search history.

(56) References Cited

U.S. PATENT DOCUMENTS

| | | | | |
|---|---|---|---|---|
| 2006/0132670 A1* | 6/2006 | Choi | ................... | G02B 5/0231 349/62 |
| 2006/0285362 A1* | 12/2006 | Cho | ................... | G02B 6/0068 362/633 |
| 2007/0091636 A1* | 4/2007 | Hwang | ................... | C08K 3/04 362/600 |
| 2010/0002418 A1* | 1/2010 | Lin | ................... | G02F 1/133615 362/97.1 |
| 2011/0007236 A1* | 1/2011 | Kim | ................... | G02F 1/13454 349/58 |
| 2011/0141400 A1* | 6/2011 | Heo | ................... | G02F 1/133615 349/65 |
| 2012/0026424 A1* | 2/2012 | Youk | ................... | G02B 6/0083 349/62 |
| 2012/0127749 A1* | 5/2012 | Kuo | ................... | G02B 6/0085 362/600 |
| 2013/0051073 A1* | 2/2013 | Park | ................... | H05K 1/0209 362/612 |
| 2013/0100694 A1* | 4/2013 | Chen | ................... | G09F 9/35 362/602 |
| 2014/0104873 A1* | 4/2014 | Yu | ................... | G02B 6/0081 362/607 |
| 2014/0376256 A1* | 12/2014 | Lin | ................... | G02B 6/0085 362/606 |

* cited by examiner

F I G. 4
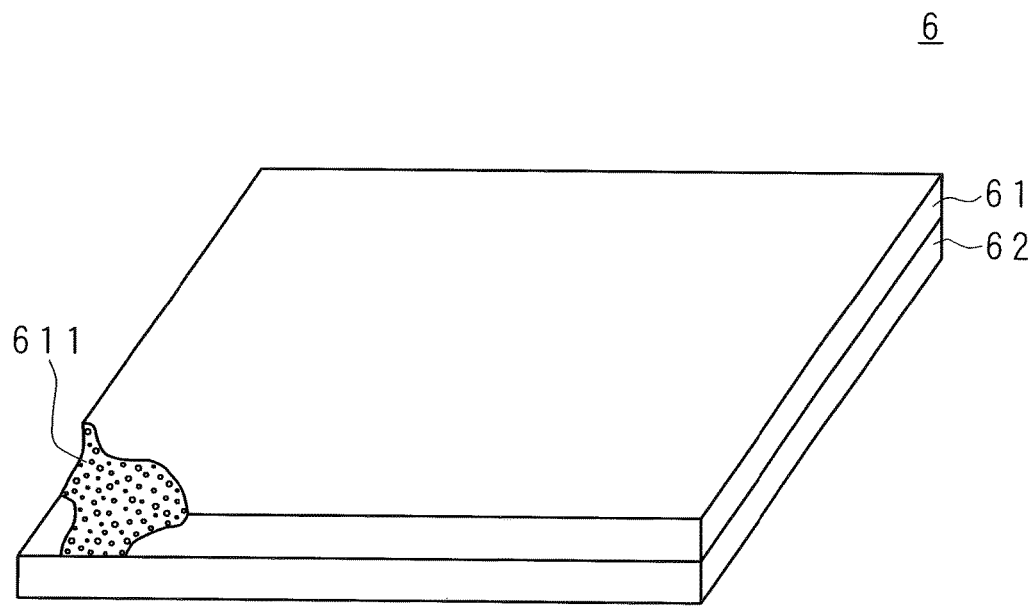

LIGHT SOURCE DEVICE AND DISPLAY DEVICE

This application is the national phase under 35 U.S.C. § 371 of PCT International Application No. PCT/JP2014/065784 which has an International filing date of Jun. 13, 2014 and designated the United States of America.

1. TECHNICAL FIELD

The present invention relates to a light source device and a display device including a light guide plate that outputs light incident from one side face through one face, a light source that is arranged on the one side face side of the light guide plate, and a housing body that has one face facing the other face of the light guide plate and houses the light guide plate and the light source.

2. DESCRIPTION OF RELATED ART

A so-called edge light that emits light from a light source disposed on the side face side of a liquid crystal panel, is provided with a light guide plate guiding light from the light source to a liquid crystal panel and a reflection sheet on the rear face side of the liquid crystal panel, and the light source, the light guide plate, and the reflection sheet are housed in a so-called back chassis.

Meanwhile, in Japanese Patent Application Laid-Open No. 2009-202532, in order to improve the processibility for processing the reflection sheet in a casing form, the processing of the reflection sheet in the casing form by using a composite reflective material formed by a thin metal plate and a porous film having a sufficient reflection property has been disclosed.

SUMMARY

However, there are cases where the back chassis has a divided structure formed by a combination of a plurality of members of mutually-different materials.

In the back chassis having such a divided structure, there is a difference in the thermal conductivity between constituent members, and the back chassis is acquired by assembling constituent members that are separate. Accordingly, thermal conduction between the constituent members cannot easily occur.

For this reason, during the operation, in a case where heat is generated from the light source, it is difficult for the generated heat to be transferred uniformly to constituent members of the back chassis. As a result, an unevenness in the temperate distribution in the entire back chassis occurs, and, in a case where the unevenness in the temperature distribution is equal to or higher than a predetermined temperature, the amount of thermal expansion of each constituent member increases, and accordingly, torsion occurs in the back chassis.

Such an unevenness in the temperature distribution has an influence on an optical sheet, and, also in the optical sheet, an unevenness in the temperature distribution locally occurs, whereby deflection occurs also in the optical sheet.

However, in the reflection sheet disclosed in Japanese Patent Application Laid-Open No. 2009-202532, such problems according to the unevenness in the temperature distribution are neither considered nor can be solved.

The present invention is devised in consideration of such situations, and an object thereof is, in a light source device including: a light guide plate that outputs light incident from one side face through one face; a light source that is arranged on the one side face side of the light guide plate; and a housing body that has one face facing the other face of the light guide plate and houses the light guide plate and the light source, to provide a light source device and a display device capable of preventing problems such as an occurrence of torsion in the back chassis, as described above, due to local concentration of heat by absorbing heat generated from the light source using the heat absorption plate by forming the reflection film reflecting light incident from the light guide plate to the light guide plate in the heat absorption plate that is arranged between the light guide plate and one face of the housing body and absorbs heat emitted from the light source and achieving a more compact configuration by not providing a reflection sheet owing to the achievement of the role of the reflection sheet using the reflection film.

According to the present invention, there is provided a light source device including: a light guide plate that outputs light incident from one side face through one face; a light source that is arranged on the one side face side of the light guide plate; a housing body that has one face facing the other face of the light guide plate and houses the light guide plate and the light source; and a heat absorption plate that is arranged between the light guide plate and the one face of the housing body and absorbs heat generated from the light source, a reflection film reflecting light incident from the light guide plate to the light guide plate being formed on the light guide plate side of the heat absorption plate.

According to the present invention, since the heat absorption plate is arranged between the light guide plate and the one face of the housing body and absorbs heat emitted from the light source and maintains the heat, local concentration of heat is prevented, and the reflection film achieves the role of a reflection sheet and reflects light incident from the light guide plate to the light guide plate.

In the light source device according to the present invention, the heat absorption plate includes a plate-shaped high thermal conductivity portion having thermal conductivity that is equal to or higher than thermal conductivity of the one face of the housing body, and the reflection film is formed on the high thermal conductivity portion.

According to the present invention, since the high thermal conductivity portion has thermal conductivity that is equal to or higher than the thermal conductivity of the one face of the housing body and has a plate shape, the absorption of heat from the one face of the housing body and the transfer of heat to the one face of the housing body can be easily executed.

In the light source device according to the present invention, the reflection film is formed with a porous resin.

According to the present invention, the reflection film is formed with a porous resin and reflects light incident from the light guide plate to the light guide plate.

In the light source device according to the present invention, the high thermal conductivity portion is formed with copper, aluminum, or graphite.

According to the present invention, the high thermal conductivity portion is formed with a material having a favorable thermal conductivity, such as copper, aluminum, or graphite, absorbs heat from the light source and the one face of the housing body, maintains the heat, and transfers heat to the one face of the housing body, thereby preventing local concentration of heat.

In the light source device according to the present invention, the housing body is configured by a plurality of members including a frame member to which the light source is attached.

According to the present invention, the housing body is configured by assembling a plurality of members including a frame member to which the light source is attached.

According to the present invention, there is provided a display device including: the light source device according to any one of the inventions described above; and a display panel that is disposed on the one face side of the light guide plate of the light source device and displays an image by using light incident through the light guide plate.

According to the present invention, light incident to the light guide plate of the light source device propagates through the inside of the light guide plate while being totally reflected, uniform light is output from the one face of the light guide plate, and the display panel displays an image by using light output from the light guide plate.

According to the present invention, by absorbing heat generated from the light source by using the heat absorption plate, problems such as an occurrence of torsion in the back chassis, as described above, due to local concentration of the heat can be prevented. In addition, since the reflection film achieves the role of a reflection sheet, the reflection sheet does not need to be additionally arranged, and accordingly, a more compact configuration can be achieved.

The above and further objects and features will move fully be apparent from the following detailed description with accompanying drawings.

BRIEF DESCRIPTION OF THE SEVERAL
VIEWS OF THE DRAWINGS

FIG. 4 is an explanatory diagram that illustrates the heat absorption plate portion of the television receiver according to the embodiment of the present invention.

DETAILED DESCRIPTION

Hereinafter, an example of a case where a light source device and a display device according to an embodiment of the present invention are applied to a television receiver including a so-called liquid crystal display panel will be described in detail with reference to the drawings.

Figure 1:
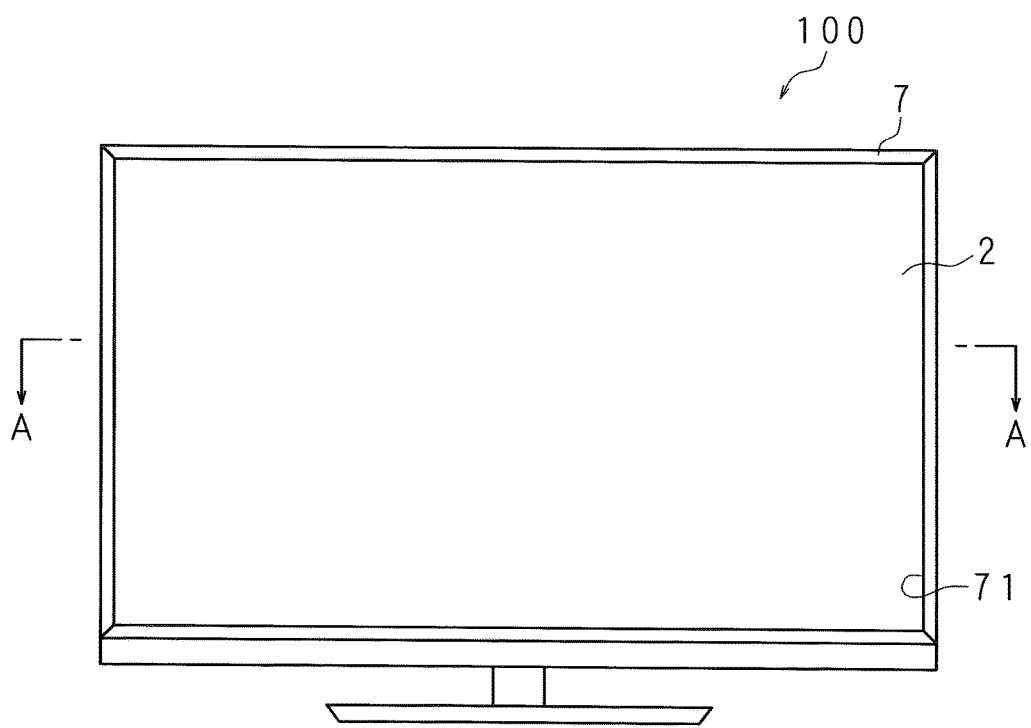
FIG. 1 is a front view that illustrates the external appearance of a television receiver according to an embodiment of the present invention.

FIG. 1 is a front view that illustrates the external appearance of a television receiver according to an embodiment of the present invention. In the figure, a reference numeral 100 represents the television receiver according to the embodiment of the present invention. Hereinafter, for the convenience of description, the lateral direction of the television receiver 100 in the figure will be referred to as a horizontal direction, the perpendicular direction thereof will be referred to as a vertical direction, and the direction of the thickness of the television receiver 100 will be referred to as a front-back direction.

Figure 2:
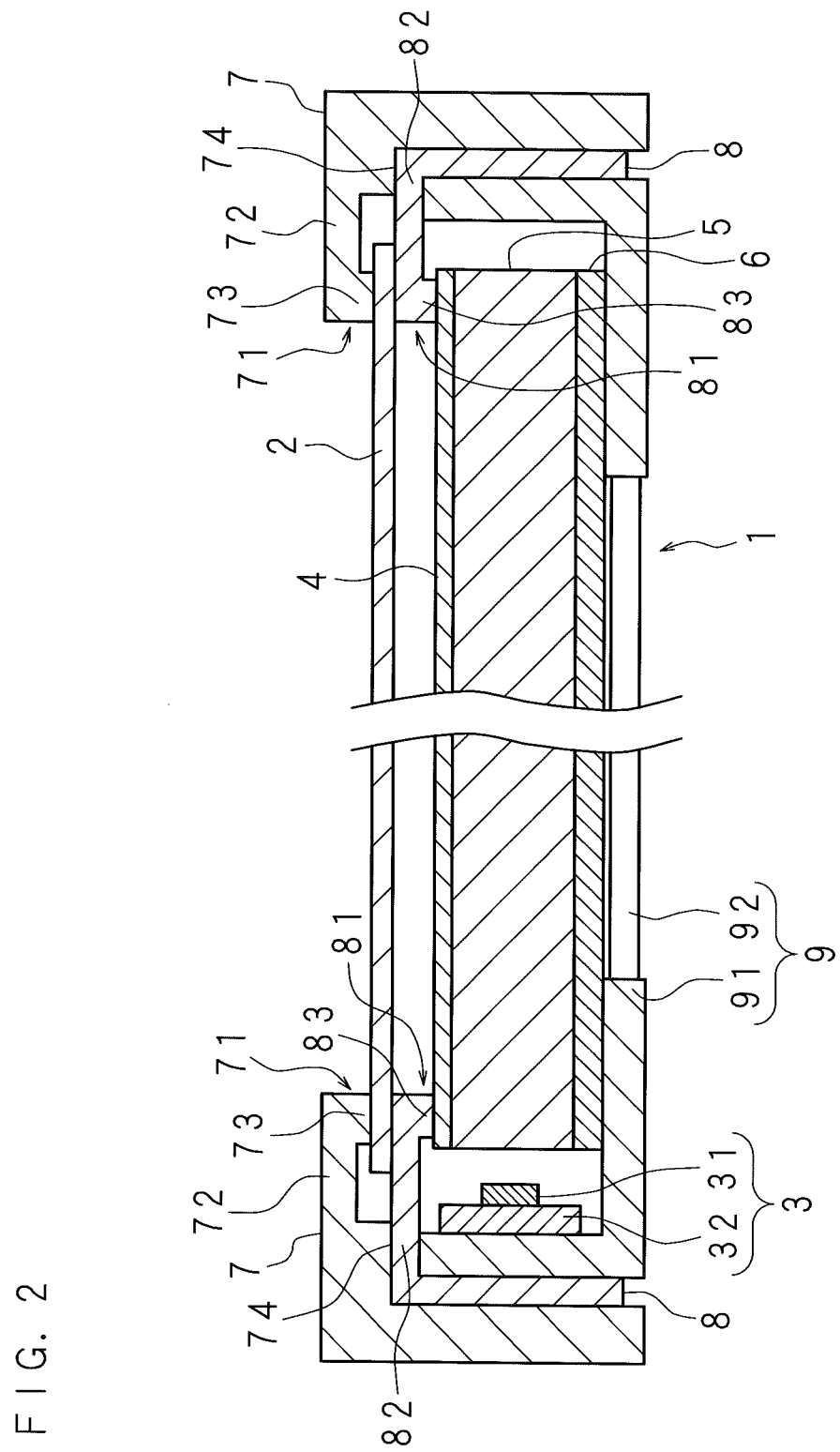
FIG. 2 is a transverse cross-sectional view taken along line A-A illustrated in FIG. 1.

FIG. 2 is a transverse cross-sectional view taken along line A-A illustrated in FIG. 1. The television receiver 100 according to the embodiment of the present invention, as illustrated in FIG. 1, includes a rectangular liquid crystal display panel 2 that displays an image on one face disposed on the front side. In addition, on the rear side of the liquid crystal display panel 2, a light source device 1 according to the present invention is arranged.

The light source device 1 includes a light source unit 3, an optical sheet 4, a light guide plate 5, and a heat absorption plate portion 6.

The optical sheet 4 is arranged such that one face thereof faces the other face of the liquid crystal display panel 2, one face of the light guide plate 5 is arranged to face the other face of the optical sheet 4, and the heat absorption plate portion 6 is arranged to face the other face of the light guide plate 5.

On a further front side than the liquid crystal display panel 2, a front cover 7 is arranged. The front cover 7 forms a cylindrical shape having a rectangular bottom following the shape of the one face of the liquid crystal display panel 2 that is visually recognized by a user and forms a shape of letter "L" in a cross-sectional view. In addition, in the bottom of the front cover 7, a rectangular display window 71 is open. Accordingly, a user can visually recognize an image that is displayed on the one face of the liquid crystal display panel 2 through the display window 71.

In addition, the front cover 7 has a predetermined width from a edge of the bottom of the front cover 7 to a edge of the display window 71, in other words, a portion that is the bottom of the front cover 7 and is a remaining portion acquired after excluding the display window 71 forms a frame portion 72 having a hollow rectangular shape. A peripheral edge portion of the one face of the liquid crystal display panel 2 is covered with the frame portion 72.

On the rear side of the inner edge portion of the frame portion 72, along the inner edge, a panel suppressing portion 73 projects in the thickness direction of the liquid crystal display panel 2. The panel suppressing portion 73 is brought into contact with the peripheral edge portion of the liquid crystal display panel 2 so as to suppress the liquid crystal display panel 2. In other words, the panel suppressing portion 73 presses the peripheral edge portion of the liquid crystal display panel 2 to an optical member holding frame 8 to be described later, thereby holding the liquid crystal display panel 2.

In addition, the liquid crystal display panel 2 is configured such that a polarizing plate (not illustrated in the figure) is arranged on the other face, incident light is separated into a P wave (horizontally-deflected component) and an S wave (vertically-deflected component) by the polarizing plate, only the P wave travels toward the one face, and the S wave is absorbed by the polarizing plate. The liquid crystal display panel 2, for example, may be an electrophoretic liquid crystal display panel.

In addition, on the rear side of the outer edge portion of the frame portion 72, so as to be brought into contact with the optical member holding frame 8, a contact face 74 is formed to have a predetermined level difference. The liquid crystal display panel 2, the optical member holding frame 8, and the light source device 1 are housed inside the front cover 7.

On the other face side of the liquid crystal display panel 2, the optical member holding frame 8 supporting the liquid crystal display panel 2 by being brought into contact with the peripheral edge portion of the other face of the liquid crystal display panel 2, is arranged. As described above, the panel suppressing portion 73 presses the peripheral edge portion of the liquid crystal display panel 2 to the optical member holding frame 8 side, and the liquid crystal display panel 2 is sandwiched between the panel suppressing portion 73 and the optical member holding frame 8.

The optical member holding frame 8 forms a cylindrical shape having a rectangular bottom following the shape of the bottom of the front cover 7 and forms a shape of letter "L" in a cross-sectional view. In addition, in the bottom of the optical member holding frame 8, a rectangular opening 81 following the display window 71 is formed, and the optical member holding frame 8, for example, is formed with plastic.

In the bottom of the optical member holding frame 8, a remaining portion acquired after excluding the opening 81 is a contact portion 82 that is brought into contact with the other face of the liquid crystal display panel 2 and the contact face 74 of the front cover 7, and the contact portion 82 forms a hollow rectangular shape. The light source device 1 is housed on the inner side of the optical member holding frame 8.

On the rear side of the inner edge portion of the contact portion 82, a sheet suppressing portion 83 holding the optical sheet 4, the light guide plate 5, and the heat absorption plate portion 6 by being brought into contact with the peripheral edge portion of the optical sheet 4 so as to suppress the optical sheet 4 projects in the thickness direction of the optical sheet 4 along the edge. In other words, the sheet suppressing portion 83 presses the peripheral edge portion of the optical sheet 4 to a back chassis 9 (housing body) to be described later, thereby holding the optical sheet 4, the light guide plate 5, and the heat absorption plate portion 6.

The optical sheet 4 executes diffusion, condensing, and the like of light that is emitted from the light source unit 3 and is incident through the light guide plate 5 and outputs more uniform light to the liquid crystal display panel 2, which is publicly known. For example, the optical sheet 4 is formed by two diffusion sheets and one prism sheet, and the prism sheet is interposed between the two diffusion sheets.

One diffusion sheet out of the two diffusion sheets, which is arranged on the light guide plate 5 side, is an optical sheet that diffuses light incident from the light source unit 3 through the light guide plate 5 and causes the light to be incident to the prism sheet. In addition, the prism sheet described above is an optical sheet that condenses light incident through the one diffusion sheet described above and outputs the condensed light to the other diffusion sheet. The light passing through the prism sheet is incident to the other diffusion sheet vertically with respect to the prism sheet.

The other diffusion sheet arranged on the liquid crystal display panel 2 side is an optical sheet that further diffuses light incident through the prism sheet so as to form a uniform luminance distribution and outputs the resultant light to the liquid crystal display panel 2.

On the other face side of the optical sheet 4, the rectangular light guide plate 5 is arranged. The light guide plate 5 guides light that is emitted from the light source unit 3 and is incident through one side face near the light source unit 3 to the optical sheet 4 (the liquid crystal display panel 2). For example, the light guide plate 5 may be configured to have an output face at which a pattern is formed such that the light incident from the light source unit 3 travels in the direction of the liquid crystal display panel 2 on one face facing the other face of the optical sheet 4. Accordingly, the light guide plate 5 can convert light incident from the light source unit 3 into plane light and uniformly distribute the plane light to the optical sheet 4 through the output face.

In addition, the light guide plate 5, for example, is formed with an acrylic resin having high transparency, and, on the other face side of the light guide plate 5, the heat absorption plate portion 6 that absorbs heat emitted from the light source unit 3 and maintains a uniform heat distribution in the entirety thereof is arranged. Furthermore, the heat absorption plate portion 6 irregularly reflects light incident to the heat absorption plate portion 6 through the other face of the light guide plate 5 among light incident from the light source unit 3 to the light guide plate 5 and outputs the resultant light from the output face of the light guide plate 5.

Near the one side face of the light guide plate 5 in the horizontal direction of the television receiver 100, the light source unit 3 is disposed. The light source unit 3 includes a strip-shaped substrate 32 arranged to face the one side face of the light guide plate 5 and a plurality of light sources 31, 31, . . . , 31 mounted along the longitudinal direction of the substrate 32.

The light source 31, for example, is a cold cathode fluorescence lamp (CCFL), an external electrode fluorescent lamp (EEFL), a hot cathode fluorescent lamp (HCFL), a light emitting diode (LED), or the like.

In addition, on the other face side of the heat absorption plate portion 6, the back chassis 9 is arranged. The back chassis 9 forms a cylindrical shape having a rectangular bottom following the shape of the heat absorption plate portion 6, and, on the inner face of the bottom, the heat absorption plate portion 6 is placed. In other words, the other face of the heat absorption plate portion 6 and the inner face of the bottom of the back chassis 9 are arranged to be in contact with each other. Accordingly, the heat absorption plate portion 6 is interposed between the light guide plate 5 and the bottom of the back chassis 9 and is brought into contact with the light guide plate 5 and the back chassis 9.

The back chassis 9 forms a so-called divided structure that is formed by a plurality of members. The back chassis 9 is formed by a portion occupying most of the bottom and the other remaining portion. In other words, the back chassis 9 includes: a rectangular rear wall member 92 that occupies most of the bottom; and a frame member 91 that is a remaining portion after excluding the rear wall member 92. The frame member 91 is formed to a hollow rectangular portion acquired by excluding the rear wall member 92 at the bottom of the back chassis 9 and a side face portion extending from the edge of the bottom in the front-back direction and forms a frame shape.

The substrate 32 of the light source unit 3 is attached to the inner side of the side face portion of the frame member 91. The frame member 91, for example, is formed with aluminum, and the rear wall member 92, for example, is formed with iron.

As described above, the sheet suppressing portion 83 presses the peripheral edge portion of the optical sheet 4 to the back chassis 9, and accordingly, the optical sheet 4, the light guide plate 5, and the heat absorption plate portion 6 are sandwiched by the sheet suppressing portion 83 and the back chassis 9.

Figure 3:
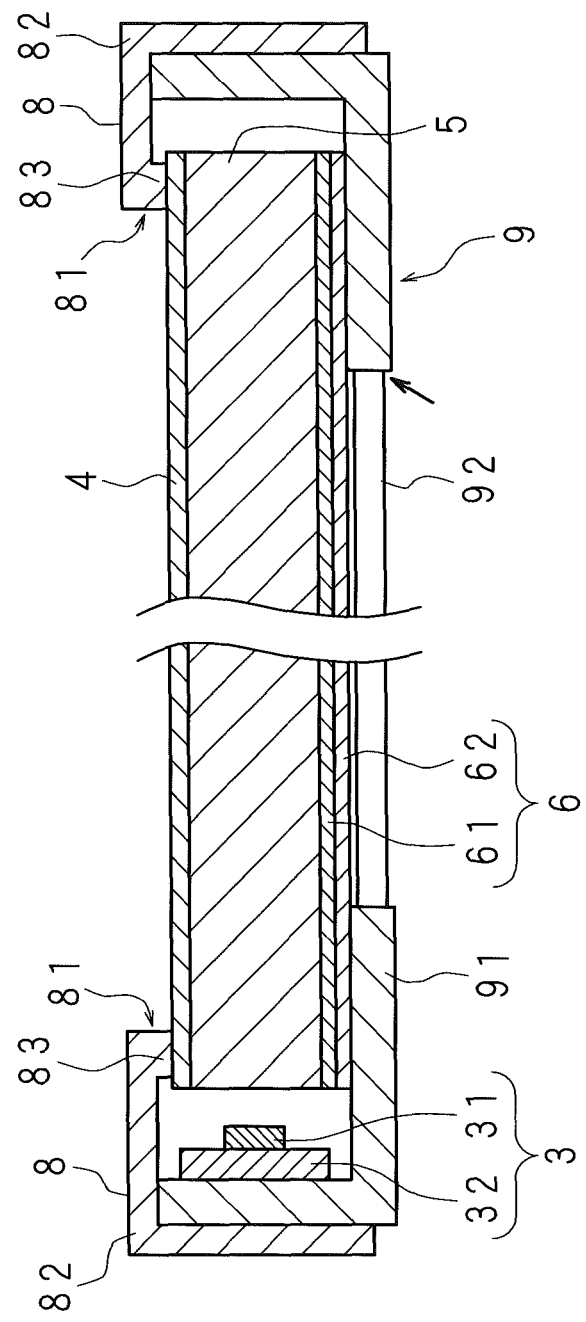
FIG. 3 is an explanatory diagram that illustrates a relation among a light guide plate, a heat absorption plate portion, and a back chassis in a television receiver according to an embodiment of the present invention.

FIG. 3 is an explanatory diagram that illustrates a relation among the light guide plate 5, the heat absorption plate portion 6, and the back chassis 9 in the television receiver 100 according to an embodiment of the present invention, and FIG. 4 is an explanatory diagram that illustrates the heat absorption plate portion 6 of the television receiver 100 according to the embodiment of the present invention.

As described above, the heat absorption plate portion 6 is arranged such that the one face faces the other face of the light guide plate 5, and the other face faces the rear wall member 92 of the back chassis 9. In addition, the heat absorption plate portion 6 includes: a plate-shaped high thermal conductivity portion 62 having high thermal conductivity; and a reflection film 61 that is formed on one face of the high thermal conductivity portion 62 and reflects incident light. Described in more detail, in the heat absorption plate portion 6, the reflection film 61 is arranged on the light guide plate 5 side, and the high thermal conductivity portion 62 is arranged on the rear wall member 92 side of the back chassis 9.

The high thermal conductivity portion 62, for example, is formed with material such as copper, aluminum, or graphite and absorbs heat emitted from the light source unit 3 and transfers the heat, thereby maintaining a uniform heat distribution in the entirety of the portion (the high thermal conductivity portion 62). The high thermal conductivity portion 62 may have a thickness of 0.3 mm in a case where copper is used as the material, have a thickness of 0.5 mm in a case where aluminum is used as the material, and have a thickness of 0.4 to 1.0 mm in a case where graphite is used as the material.

As above, the high thermal conductivity portion 62 has thermal conductivity higher than the conductivity of the frame member 91 and the rear wall member 92 of the back chassis 9 and has a plate shape, and accordingly, heat can be easily absorbed from the frame member 91 and the rear wall member 92, and heat can be easily transferred to the frame member 91 and the rear wall member 92.

The reflection film 61, for example, is formed with white PET having high reflectivity and irregularly reflects light incident to the heat absorption plate portion 6 through the other face of the light guide plate 5. For example, the reflection film 61 has a thickness of 0.2 mm and is a porous medium including a plurality of voids 611, 611, . . . , 611.

The reflection film 61, for example, is formed on the one face of the high thermal conductivity portion 62 by directly performing cast molding using a thermoplastic resin composition and a void forming agent. Accordingly, it is more difficult for the reflection film 61 to be peeled off from the high thermal conductivity portion 62 than a case where the reflection film is generated by a bonding process. In addition, in a case where graphite is used as the material of the high thermal conductivity portion 62, by generating the reflection film 61, the strength of the high thermal conductivity portion 62 on the edge and at the corner is improved.

Accordingly, the reflection film 61 of the heat absorption plate portion 6, as described above, serves as a reflection sheet that irregularly reflects light incident to the heat absorption plate portion 6 through the other face of the light guide plate 5 and returns the light to the output face side of the light guide plate 5 and, during the operation of the television receiver 100, achieves the role of a heat spreader that absorbs heat emitted from the light source unit 3 and radiates heat to the outside through the frame member 91 being brought into contact therewith while maintaining a uniform thermal distribution in the entirety of the high thermal conductivity portion 62.

By employing the configuration as described above, the television receiver 100 according to the embodiment of the present invention can prevent the occurrence of the problems as described above in the light source device 1 (the television receiver 100).

In other words, in a case where the back chassis 9 has a divided structure that is configured by a plurality of members (the frame member 91 and the rear wall member 92) of mutually-different materials like that of the television receiver 100 according to the embodiment of the present invention, the thermal conductivity is different between the frame member 91 and the rear wall member 92.

Meanwhile the light source unit 3 is attached to the frame member 91 and, during the operation of the television receiver 100, heat is generated from the light source unit 3, and the generated heat is directly transferred to the frame member 91. However, since the light source unit 3 and the frame member 91 are formed using materials having different thermal conductivity and are separated from each other, it is difficult for heat to be transferred from the frame member 91 to the rear wall member 92, and an unevenness in the temperature distribution of the entire back chassis 9 occurs.

In other words, the temperature of the peripheral edge portion of the back chassis 9 configured by the frame member 91 is higher than a portion configured by the rear wall member 92. In addition, in a case where the unevenness in the temperature distribution is predetermined temperature or higher, a difference between thermal expansion amounts of the frame member 91 and the rear wall member 92 increases, and torsion occurs in the back chassis 9 (the television receiver 100).

Such an unevenness in the temperature distribution also has an influence on the optical sheet 4, and accordingly, also in the optical sheet 4, an unevenness in the temperature distribution occurs between the peripheral edge portion and the center portion. Thus, the thermal expansion amounts of the peripheral edge portion and the center portion are different from each other, and deflection occurs also in the optical sheet 4.

In addition, as described above, as the torsion occurs in the back chassis 9, and the deflection occurs in the optical sheet 4, luminance unevenness appears in the liquid crystal display panel 2, whereby the user comes to have a sense of discomfort.

In contrast to this, in the television receiver 100 according to the embodiment of the present invention, since the high thermal conductivity portion 62 of the heat absorption plate portion 6 has high thermal conductivity, the high thermal conductivity portion 62 absorbs heat emitted from the light source unit 3 or absorbs heat also from the frame member 91, uniformly distributes the heat in the entirety thereof, and maintains such a state. Accordingly, the heat can be easily transferred also to the rear wall member 92 near the high thermal conductivity portion 62, whereby an unevenness in the temperature distribution between the frame member 91 and the rear wall member 92 of the back chassis 9 is decreased. Thus, the torsion of the back chassis 9 can be prevented.

In addition, also in the optical sheet 4, similar to the back chassis 9, an unevenness in the temperature distribution between the peripheral edge portion and the center portion of the optical sheet 4 can be decreased, and the occurrence of deflection can be prevented.

Furthermore, according to the television receiver 100 of the embodiment of the present invention, since the reflection film 61 of the heat absorption plate portion 6 achieves the role of a reflection sheet, the reflection sheet does not need to be additionally arranged, and the configuration is simple, whereby a compact configuration of the device and a decrease in the number of components can be achieved.

The advantages according to the present invention are not limited thereto. Generally, as the material of a reflection sheet, a flexible material is used, and, in a case where such a flexible reflection sheet is used and the divided structure described above is employed, a level difference is generated at a boundary (denoted by an arrow in FIG. 3) between constituent portions. The flexible reflection sheet is influenced by such a level difference, the light guide plate 5 is damaged, and the contact between the reflection sheet and the light guide plate 5 becomes non-uniform, whereby luminance unevenness occurs.

However, according to the television receiver 100 of the embodiment of the present invention, the shape of the reflection film 61 (reflection sheet) is constantly maintained to be a plate shape by the high thermal conductivity portion 62, and accordingly, such a problem can be solved.

In addition, in the description presented above, while a case has been described as an example in which the light source unit 3 is arranged only in the lower part of the television receiver 100, the present invention is not limited thereto but, apparently, may be applied also to a case where the light source unit 3 is arranged at one or a plurality of places in the television receiver 100 in any one of the horizontal and vertical directions.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A light source device comprising:
    a light guide plate that outputs light incident from one side face through one face;
    a light source that is arranged on the one side face side of the light guide plate;
    a housing body that has one face facing an opposite face of the light guide plate opposite to the one face of the light guide plate and houses the light guide plate and the light source; and
    a heat absorption plate that is arranged between the light guide plate and the one face of the housing body and absorbs heat generated from the light source, the heat absorption plate having a reflection film that is formed on a light guide plate side of the heat absorption plate and reflects light incident from the light guide plate to the light guide plate, and a single plate-shaped high thermal conductivity portion having a thermal conductivity that is equal to or higher than a thermal conductivity of the one face of the housing body,
    wherein
    the one face of the housing body is formed by a rear wall member which is arranged near the single plate-shaped high thermal conductivity portion, and a frame member disposed circumferentially around the rear wall member and which is made of a material different from the rear wall member and in contact with the single plate-shaped high thermal conductivity portion,
    the reflection film contacts only with the light guide plate and the single plate-shaped high thermal conductivity portion, and
    the single plate-shaped high thermal conductivity portion has substantially same size as that of the light guide plate.

2. The light source device according to claim 1, wherein the reflection film is formed on the single plate-shaped high thermal conductivity portion.

3. The light source device according to claim 1, wherein the reflection film is formed with a porous resin.

4. The light source device according to claim 1, wherein the single plate-shaped high thermal conductivity portion is formed with copper, aluminum, or graphite.

5. A display device comprising:
    the light source device according to claim 1; and
    a display panel that is disposed on the one face side of the light guide plate of the light source device and displays an image by using light incident through the light guide plate.

6. The light source device according to claim 1, wherein the reflection film is directly cast molded on the single plate-shaped high thermal conductivity portion.

7. The light source device according to claim 6, wherein the reflection film is formed with a thermoplastic resin composition and a void forming agent.

* * * * *